United States Patent [19]

Häkkinen

[11] Patent Number: 4,487,821

[45] Date of Patent: Dec. 11, 1984

[54] BATTERY CELL FOR A PRIMARY BATTERY

[75] Inventor: Allan Häkkinen, Vantaa, Finland

[73] Assignee: Innovex Oy, Helsinki, Finland

[21] Appl. No.: 276,887

[22] Filed: Jun. 24, 1981

[30] Foreign Application Priority Data

Jul. 1, 1980 [FI] Finland ............................... 802104

[51] Int. Cl.³ .............................................. H01M 6/34
[52] U.S. Cl. ................................. 429/119; 429/220; 429/225
[58] Field of Search ............... 429/119, 118, 220, 225, 429/209

[56] References Cited

U.S. PATENT DOCUMENTS

| | | | |
|---|---|---|---|
| 2,637,757 | 5/1953 | Wilke | 429/119 |
| 2,699,459 | 1/1955 | Blake et al. | 429/119 |
| 2,711,437 | 6/1955 | Wilke | 429/119 X |
| 3,563,804 | 2/1971 | Gavin et al. | 429/119 |
| 3,966,497 | 6/1976 | Honer | 429/119 |
| 4,063,006 | 12/1977 | Murphy | 429/119 |
| 4,076,904 | 2/1978 | Chen | 429/119 X |

*Primary Examiner*—Charles F. Le Fevour
*Attorney, Agent, or Firm*—Lowe, King, Price & Becker

[57] ABSTRACT

A battery cell for a primary battery, particularly a flat cell battery to be activated on being taken into use, e.g., when submerged into water. The battery cell comprises a positive current collector and a negative electrode. A separator layer which, being in contact with the negative electrode, is disposed between said negative electrode and the positive current collector. A depolarizing layer containing a depolarizing agent is disposed between the positive current collector and the separate layer. An intermediate layer of a porous, electrically insulating, and water-absorbing material is disposed next to the positive current collector and arranged in contact with the depolarizing agent.

12 Claims, 7 Drawing Figures

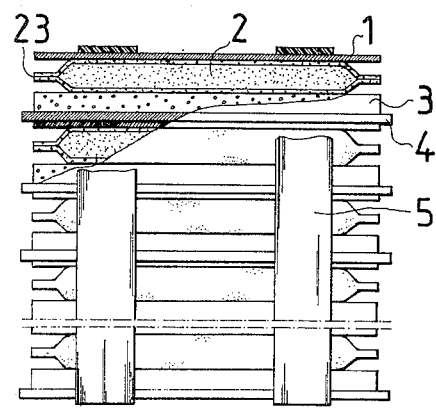
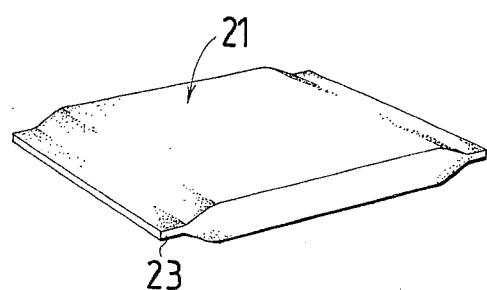
Fig. 5          Fig. 6
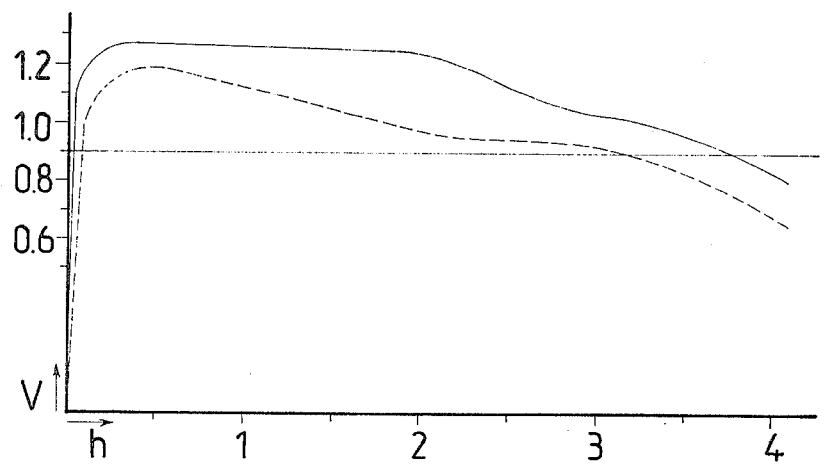
Fig. 7

BATTERY CELL FOR A PRIMARY BATTERY

The present invention concerns a battery cell for a primary battery, particularly a flat cell battery to be activated on being taken into use, e.g., when submerged into water, comprising:
- a positive current collector;
- a negative electrode;
- a separator layer which, being in contact with the negative electrode, is disposed between said negative electrode and the positive current collector; and
- a depolarizing layer containing a depolarizing agent and being disposed between the positive current collector and the separator layer.

Cells of this type are used in batteries that are activated on being taken into use, e.g., when submerged into water. Typical fields of use are life belts and lifesaving equipment, emergency radios, and radiosondes. It is characteristic of these batteries that their use is continuous and of a relatively short duration.

The depolarizing agent used in battery cells dissolves slowly and prevents formation of hydrogen on the positive current collector. The water penetrating into the cell becomes conductive, and the metal substance of the negative electrode, e.g., Mg, dissolves. Thereby magnesium chloride (MgCl) is produced, and a voltage arises between the positive current collector (e.g. Cu) and the negative electrode (e.g., Mg).

A prior art battery cell construction is shown in FIG. 1 of the attached drawings. Therein a negative electrode 4, a separator layer 3 of an electrically insulating substance that absorbs water, a depolarizing layer 2, and a positive current collector 1 are disposed one on top of the other in a sandwich arrangement. The depolarizing layer 2 is a plate-shaped structure prepared into a tablet by means of heavy compression and consisting of copper chloride, lead chloride, or of a similar compound soluble in water. The use of various chromates and of copper oxalate is also known. Copper chloride is used in radiosonde batteries. In batteries to be activated by means of sea water, silver chloride or lead chloride is usually used. The depolarizing agent or mixture, whose conductivity has been increased, e.g., by means of graphite, is placed in direct contact with the positive current collector 1. This current collector may be, e.g., a copper mesh or copper foil. Lead may also be used as a positive current collector. An essential feature of the prior art technique has been the opinion that the depolarizing agent must be firmly fixed on the positive current collector in order to guarantee the functioning of the battery cell. Graphite has been used in order that current should be able to flow at all. Moreover, binder agents have been required to make sure that the tablet holds together.

A drawback of the known constructions is that the depolarizing agent is consumed when the battery is used, within the area closest to the negative electrode. Then, a rather dense copper layer is formed on the face of the electrode, whereby the internal resistance of the battery is increased. It follows from this that a considerable part of the depolarizing agent cannot be utilized. Moreover, it is to be noticed that the electrolyte can affect only the surface of the compressed depolarizing tablet.

Surprisingly, it has now been found that the depolarizing agent, e.g., CuCl, may be placed apart from the positive current collector such that an insulating, porous, water-absorbing layer of, e.g., paper, non-woven fabric, etc. is disposed between the depolarizing agent layer and the positive current collector. A separator layer made of a similar material must be placed between the depolarizing layer and the negative electrode.

More specifically, the battery cell in accordance with the invention is characterized by an intermediate layer made of a porous, electrically insulating, and water-absorbing material and limited by the positive current collector and arranged in contact with the depolarizing agent.

By means of the invention, remarkable advantages are achieved. Thus, the depolarizing agent no longer has to be fixed firmly onto the positive current collector. The depolarizing agent can be utilized more efficiently, for when, e.g., a powdery substance is used, it can be utilized completely. Moreover, no conductive substance, such as graphite or binder agent, has to be mixed into the depolarizing agent. The whole depolarizing agent is used homogeneously, and the positive current collector remains bright. Moreover, by means of the invention, the output of the battery can be made considerably better, its weight be made lower and size smaller as compared with earlier batteries. The internal resistance of the battery is reduced, and the construction of the battery cells permits automatic production of batteries.

The invention will be examined below in more detail, reference being made to the exemplifying embodiments in accordance with the attached drawings.

FIG. 5 shows a battery assembled out of battery cells in accordance with FIG. 2, partly in section.

FIG. 6 is a perspective view of a depolarization pad used in the construction shown in FIG. 2.

FIG. 7 is a graphical presentation of the discharge curve of a battery cell in accordance with the invention as compared with a known battery cell.

Figure 1:
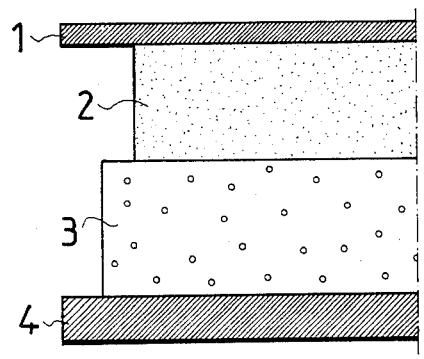
FIG. 1 shows, as indicated above, a known battery cell as a sectional view.
Figure 2:
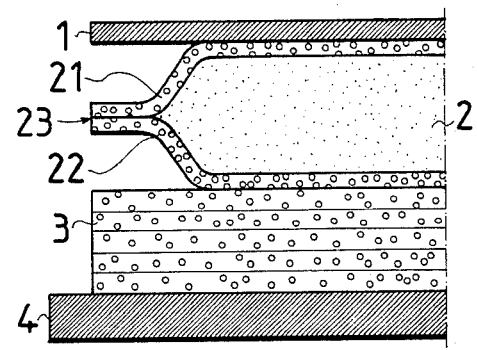
FIG. 2 shows an embodiment of a battery cell in accordance with the invention, as a sectional view.

The construction shown in FIG. 2 comprises a Mg plate 4 which functions as negative electrode and whose thickness is in the example case about 0.3 mm. On that plate a separator layer 3 is disposed, which is preferably made of a porous, electrically insulating material that absorbs an abundance of water, e.g., a material resembling felt or cotton wad. In the example case the separator layer 3 has a structure consisting of several layers. The total thickness of the separator layer 3 is in the example case about 1.5 mm.

A pad made by heat sealing out of two layers 21 and 22 of non-woven fabric is disposed between the separator layer 3 and a Cu plate 1 functioning as positive current collector, inside of which pad, CuCl powder 2 functioning as a depolarizing agent is placed. In stead of heat sealing (23), the pad 21, 22 may also be prepared by folding. The upper part of the pad 21, 22, separating the depolarizing agent 2 from the positive current collector 1, i.e., the intermediate layer 21, may be quite thin, e.g., 0.05 to 0.5 mm, in the example case 0.1 mm. The non-woven fabric may be, e.g., a fabric of polypropylene fibres to which viscose fibres have been added. In stead of a non-woven fabric, it is also possible to use a paper that has good absorption and electrical insulation properties.

Figure 3:
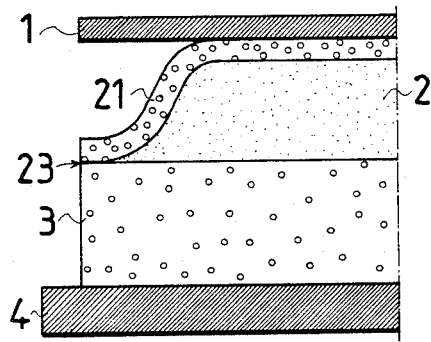
FIG. 3 shows a second embodiment of the battery cell in accordance with the invention, as a sectional view.

FIG. 3 shows an embodiment in which the pad structure consists of the intermediate layer 21 proper and a separator layer 3, to which the intermediate layer 21 is connected at its edges by heat sealing 23. In this case, and otherwise as well, the pad structure 21 may be of the same material as the separator layer 3.

Figure 4:
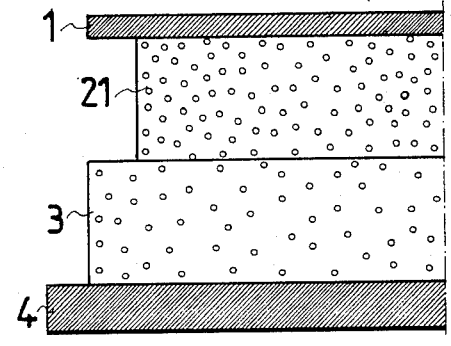
FIG. 4 shows a third embodiment of the battery cell in accordance with the invention, as a sectional view.

FIG. 4 shows an embodiment in which the intermediate layer 21 is a porous layer of an electrically insulating and water-absorbing material saturated with the depolarizing agent and thereupon dried.

FIG. 5 shows a battery construction which includes several flat cells of the type shown in FIG. 2, connected in series with each other and tied together by means of tightening straps 5.

FIG. 6 shows a depolarizing agent pad in accordnace with FIG. 2, the upper part 21 and lower part of said pad being joined together by heat sealing 23.

From the curves shown in FIG. 7, it appears that the cell construction in accordance with FIG. 2 has essentially better discharge properties than known constructions. For the sake of comparison, it should be mentioned that in a test performed, a conventional battery gave a capacity of 175 Wh per kg of depolarizer, whereas a corresponding battery in accordance with the invention gave a capacity of 261 Wh/kg, at the same time as the discharge curve of the new battery (full line, FIG. 7) was more even.

Within the scope of the invention, solutions diverging from the exemplifying embodiments described above are conceivable. Thus, in fastening the edge of the intermediate layer it is possible to use in stead of heat sealing, e.g., so-called "hot-melt" glueing or any other conventional method of fastening. Moreover, fastening of the edge is not even necessary if the quantity of the depolarizing agent is small, which is often the case. It is also possible, by folding a single-layer intermediate layer sheet, to form a multi-layer separator layer made of one piece with same. Even such a solution should be mentioned in which the intermediate layer is a combination of a plate-like structure saturated with the depolarizing agent and thereupon dried and of a separate layer limited by the positive current collector and made of a porous, electrically insulating, and water-absorbing material.

What is claimed is:

1. A battery cell for a primary battery, particularly a flat cell battery to be activated when submerged into water, comprising:
   a positive current collector;
   a negative electrode;
   a separator layer which, being in contact with the negative electrode, is disposed between said negative electrode and the positive current collector;
   a depolarizing layer containing a depolarizing agent and being disposed between the positive current collector and the separator layer; and
   an intermediate layer of a porous, electrically insulating, and water-absorbing material and limited by the positive current collector and arranged in contact with the depolarizing agent; said intermediate layer being a part of a pad structure disposed between the positive current collector and the separator layer inside of which the depolarizing agent is placed, the pad structure being heat sealed or sealed by folding.

2. A battery cell as claimed in claim 1, wherein the pad structure comprises a separate bag structure.

3. A battery cell as claimed in claim 1, wherein the pad structure comprises said intermediate layer proper and the separator layer, the intermediate layer being connected at its edges with said separator layer.

4. A battery cell as claimed in claim 1, wherein the depolarizing agent is CuCl or $PbCl_2$ powder.

5. A battery cell as claimed in claim 1, wherein the pad structure is made of the same material as the separator layer.

6. A battery cell as claimed in claim 1, wherein the pad structure is made of a material differing from that of the separator layer.

7. A battery cell as claimed in claim 1, wherein the thickness of the intermediate layer is substantially less than the thickness of the separator layer.

8. A battery cell as claimed in claim 7, wherein the thickness of the intermediate layer is 0.05 to 0.5 mm.

9. A battery cell as claimed in claim 1, wherein the intermediate layer is made of non-woven fabric.

10. A battery cell as claimed in claim 1, wherein the intermediate layer is made of paper.

11. A battery cell as claimed in claim 1, wherein the intermediate layer is a plate-like structure saturated with the depolarizing agent and dried.

12. A battery cell as claimed in claim 1, wherein the intermediate layer is a combination of a plate-like structure saturated with the depolarizing agent and dried and of a separate layer limited by the positive current collector and made of a porous, electrically insulating, and water-absorbing material.

* * * * *